(No Model.)

M. & R. F. HALFPENNY.
MACHINE FOR FILLING BOBBIN STICKS WITH BOBBINS.

No. 548,193. Patented Oct. 22, 1895.

Witnesses

Inventors
Mark Halfpenny
Robert F. Halfpenny
By Hopkins & Atkins
Attorneys (No Model.) 7 Sheets—Sheet 3.
M. & R. F. HALFPENNY.
MACHINE FOR FILLING BOBBIN STICKS WITH BOBBINS.
No. 548,193. Patented Oct. 22, 1895.

(No Model.)  7 Sheets—Sheet 4.
M. & R. F. HALFPENNY.
MACHINE FOR FILLING BOBBIN STICKS WITH BOBBINS.
No. 548,193.  Patented Oct. 22, 1895.

Witnesses
Louis G. Julihn
E. G. Julihn

Inventors
Mark Halfpenny
Robert F. Halfpenny
By Hopkins & Hiss
Attorneys (No Model.) 7 Sheets—Sheet 5.
M. & R. F. HALFPENNY.
MACHINE FOR FILLING BOBBIN STICKS WITH BOBBINS.
No. 548,193. Patented Oct. 22, 1895.

Fig. 11.

(No Model.) 7 Sheets—Sheet 7.

M. & R. F. HALFPENNY.
MACHINE FOR FILLING BOBBIN STICKS WITH BOBBINS.

No. 548,193. Patented Oct. 22, 1895.

Witnesses
Louis G. Julihn
E. G. Julihn

Inventors
Mark Halfpenny
Robert F. Halfpenny
By Hopkins & Attaius
Attorneys

UNITED STATES PATENT OFFICE.

MARK HALFPENNY AND ROBERT FOSTER HALFPENNY, OF LEWISBURG, PENNSYLVANIA.

MACHINE FOR FILLING BOBBIN-STICKS WITH BOBBINS.

SPECIFICATION forming part of Letters Patent No. 548,193, dated October 22, 1895.

Application filed November 11, 1892. Serial No. 451,688. (No model.)

*To all whom it may concern:*

Be it known that we, MARK HALFPENNY and ROBERT FOSTER HALFPENNY, of Lewisburg, county of Union, and State of Pennsylvania, have invented a certain new and useful Machine for Filling Bobbin-Sticks with Bobbins, of which the following is a specification, reference being had to the accompanying drawings.

The object of our invention is to produce a machine for automatically collecting and distributing loose bobbins, arranging them in bobbin-sticks, and in short for mechanically performing all the operations necessary to the separating of bobbins from a confused pile and arranging them in the usual order as for use.

Our machine is designed as an adjunct for spinning-machines.

Heretofore it has been necessary in filling bobbing-sticks for the mule to separate the bobbins by hand and arrange and transport them for use by the same means.

By our invention we accomplish mechanically that which has heretofore required the labor of one or more persons.

In the accompanying drawings.

Figure 1:
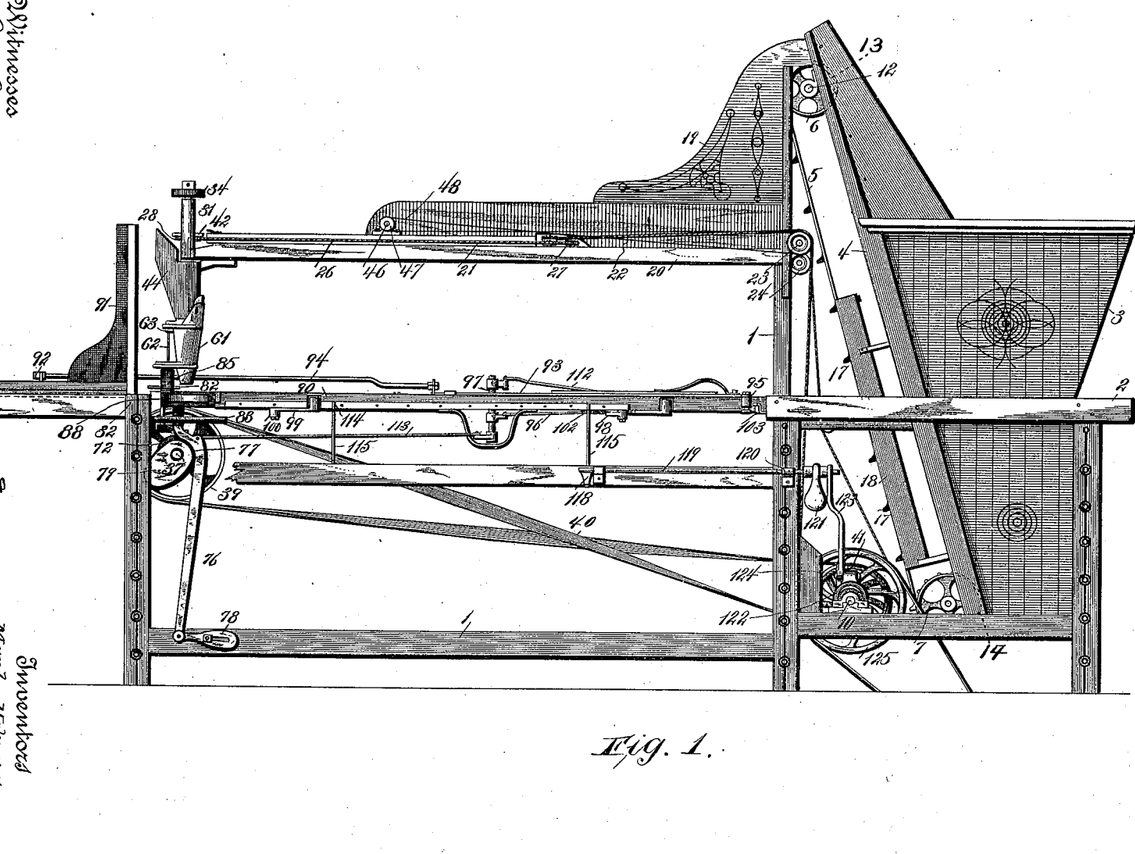
Figure 1 is a side elevation of our machine complete.

Referring to the figures on the drawings, 1 indicates the main frame, which is clearly shown in side elevation in Fig. 1 of the drawings.

2 indicates the hopper-frame, which is also shown in the same figure, and which forms substantially a part of the main frame, but which, for the sake of more clearly designating the parts, we have preferred to indicate separately.

Figures 6, 7:
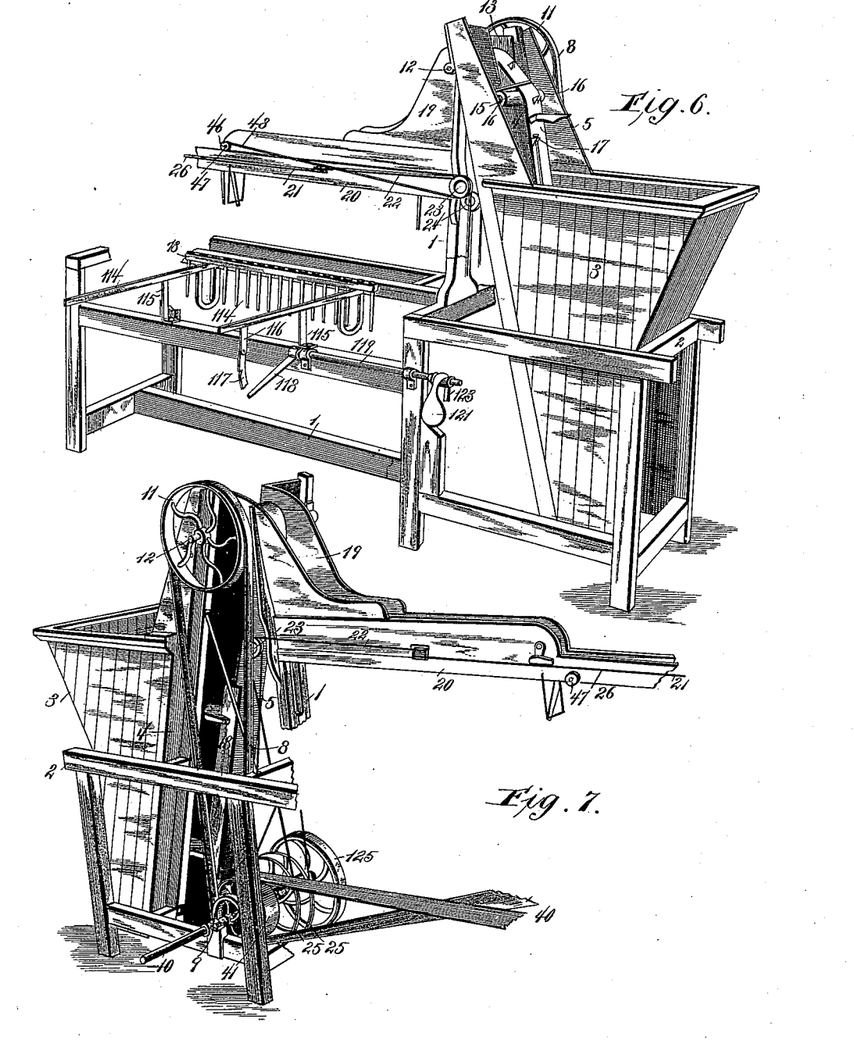
Fig. 6 is a perspective view of one end of our machine.
Fig. 7 is a perspective view looking at it in the opposite direction.
Figure 8:
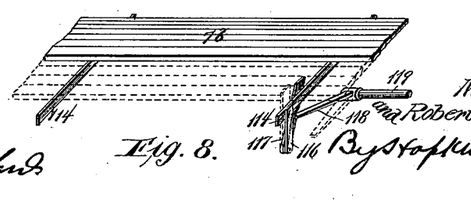
Fig. 8 is a view of the automatic stop device for controlling the operation of the machine.

3 indicates a hopper, (see Figs. 1, 6, and 7 of the drawings,) which is preferably made of wood of suitable shape and size and having a preferably converging bottom, substantially as illustrated. Its inner side 4 is preferably extended from near the bottom of the hopper-frame to the top of the main frame and is inclined slightly toward the main frame in accordance with the inclination of the collector 5. The collector preferably consists of an endless belt mounted upon pulleys 6 and 7, carried in suitable bearings near the top and bottom of the inclined side 4. The pulley 7 may be a sprocket-wheel adapted to mesh with the endless band and drive it with accuracy and precision. Motion is imparted to the collector by suitable means—as, for example, by a belt 8 passing over a pulley 9 on the main driving-shaft 10, and of a driving-pulley 11, secured to the shaft 12 of the pulley 6. The pulleys 6 and 7 project somewhat into recesses 13 and 14 in the top and bottom of the inclined side 4, respectively, in order to permit the free movement of the collector inside of the hopper. Idle-wheels 15, one of which is shown clearly in Fig. 6 of the drawings, are preferably provided near the ends of the recesses at the top and bottom, respectively, of the side 4, suitable bearings 16 being provided for them on that side. The collector is provided with claws 17, which are preferably arranged in alternate order upon the collector—that is to say, part of the claws being arranged upon one side of the belt and part upon the other, so as to allow the greatest possible space between the successive claws without diminishing too greatly the number of the claws upon the belt. Each of the claws may, for example, consist of a pair of triangular pieces of metal secured to the belt and separated from each other by a space sufficient to easily accommodate the neck of a bobbin, one of which is shown depending, as in practice, from one of the claws in Fig. 6 of the drawings.

18 indicates a guide-piece, which may or may not be used, and which may be secured, as illustrated in Fig. 1, to the inside of the inclined side 4 of the hopper. The office of this guide-piece is to direct the movement of the collector squarely upon the pulleys; but, as before stated, it is not ordinarily essential.

19 indicates a hopper-chute, preferably supported upon the beam 20 of the main frame. The sides thereof are preferably arranged to slightly converge at their bottoms, as is clearly shown in Fig. 7 of the drawings, and are designed to receive and guide the bobbins carried upon the collector. The conveyer 21 preferably consists of two flexible bands passing around suitable guide-pulleys and driven by suitable power. It is preferably divided into two parts, one of which consists of a pair of bands 22 passing around pulleys 23 and 24 and driven by pulleys 25, keyed to the main driving-shaft. The other part consists of a pair of bands 26 passing around pulleys 27 and 28. The pulleys 28 are carried upon vertical shafts 29 and 30, mounted in suitable bearings in the head frame-piece 31, that is supported upon the table 32 of the machine. The shaft 29 is the driving-shaft of this part of our machine, and through a gear 33, secured to it above the head-frame, and a gear 34, secured in like manner to the shaft 30, communicates equal motion to the latter. The shaft 29 is driven by suitable mechanism—as, for example, intermeshing gears 35 and 36, secured, respectively, to the lower extremity of the shaft 29 and to a shaft 37, carried in suitable bearings 38 in the main frame. The shaft 37 carries a driving-pulley 39, which receives motion through a belt 40 from a pulley 41, secured to the main driving-shaft. To the shafts 29 and 30 are secured feed-disks 42. They are preferably carried immediately above the pulleys 28, and if desired may be made integral therewith.

43 indicates notches in the peripheries of the feed-disks. They are a little larger, respectively, than half the size of the bobbin-heads. In practice the notches in each of the disks register, as shown in two positions in Figs. 9 and 10 of the drawings, and are designed to grasp the head of a bobbin, to close upon it, and finally to discharge it into a vertical chute 44.

It will be perceived from the foregoing that the two conveyers may be driven at different rates of speed, but that the speed of the conveyer which last receives the bobbins is timed to the rotation of the feed-disks to which these conveyers are designed to transport the bobbins. The bobbins as discharged from the collector 5 are dropped between the bands composing the conveyer; but it may occur when the machine is moving at a high rate of speed that the bobbins will not be discharged with uniform regularity, and that their heads, which are designed to rest squarely and separately upon the sides of the conveyer, may overlap one another. For this purpose we employ suitable distributing mechanism. By reason of its simplicity we prefer a fan or flapper 45, carried upon a shaft 46 across the hopper-chute, and adapted to be driven through a pulley 47, secured to the shaft by means of a belt 48, that passes around one of the pulleys 23, which is made double in order to accomodate it.

Figure 9:
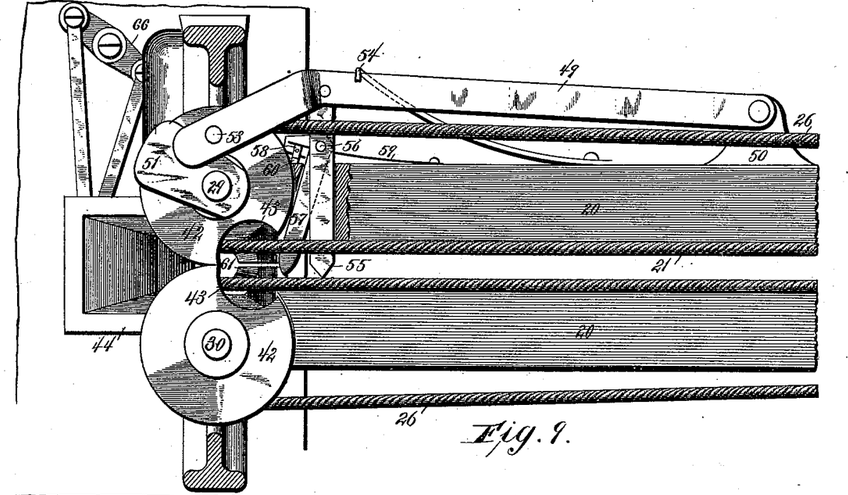
Fig. 9 is a top plan view of the rotary feed-disks, showing the relative positions of the parts immediately after taking a bobbin, the bobbin being omitted for the purpose of perspicuity.
Figure 10:
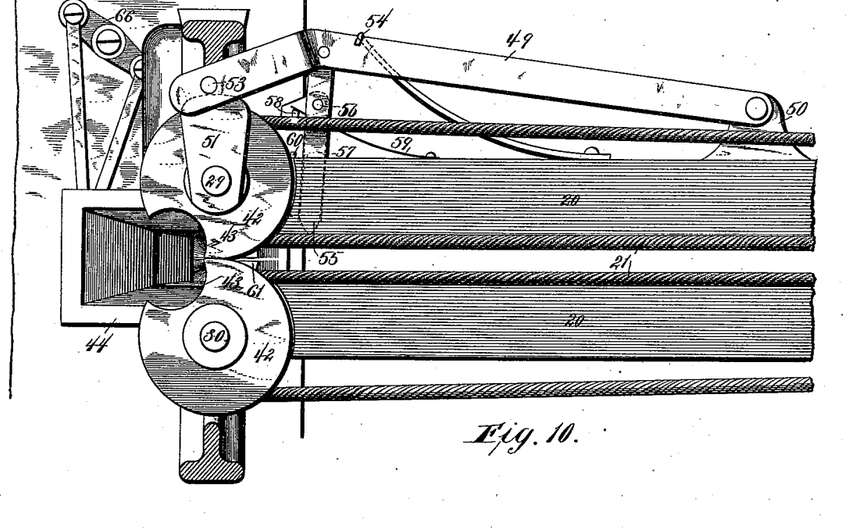
Fig. 10 is a similar view showing the relative position of the parts in discharging the bobbin.

As above suggested, the office of the feed-disks or feeding mechanism being to take the bobbins one at a time from the horizontal conveyer and drop it into the chute, inasmuch as the bobbins are continually supplied to the conveyer and are carried forward by it toward the disks, it becomes necessary to provide means for interrupting the continuous movement of the bobbins toward the disks, and in order to prevent the crowding of the bobbins against the disk and the possibility of their being crushed by the rotation of the disks to provide means for presenting a single bobbin to the disks each time the notches in the disk are in the position in which they are ready to receive it. This mechanism we will call "bobbin-separating mechanism." It preferably consists of an intermittently-actuated lever 49, pivoted upon a projection 50 to one side of the frame. A suitable cam 51, secured to the top of the shaft 29, is shown in Figs. 9 and 10 of the drawings. An anti-friction-roller 52, carried upon a stud 53, projecting from the under side of the lever, may be employed to ride against the face of the cam.

54 indicates a spring secured to the side of the frame and adapted to hold the lever in engagement with this cam. Pivoted to the lever is a separating-finger 55, upon one side of which is pivoted at 56 a bell-crank lever or kicker 57, which is provided with a projection 58, against which bears a spring 59, that is secured at its opposite end to the side of the frame.

60 indicates a limiting-stop upon the side of the frame, against which the projection 58 impinges, and whereby the kicker is turned upon its pivot to drive the bobbin perpendicularly between the notches of the disks.

In Fig. 9 of the drawings the kicker is shown in the position which it occupies immediately after it has forced the bobbin into position. In Fig. 10 it is shown in the position it occupies immediately before action. Referring to the latter figure, the lever 49 being actuated by its cam, the kicker by the action of its spring is brought into alignment with the finger 55 and both are withdrawn from the conveyer, so as to allow the bobbins to move up toward the disks. By the further rotation of the disks the lever 49, urged by its spring, moves back toward the conveyer, inserting the finger between the last bobbin and the next preceding. Immediately thereupon, by the impingement of the projection 58 against the stop 60, the notches upon the disks being about in the position shown in Fig. 9 of the drawings, the kicker throws the last bobbin separated from its neighbor between the notches, the rotating disks feed it forward and drop it into the chute, and the operation is repeated as before. In practice the motion of the disks, the lever, finger, and kicker is very rapid, and the complete operation above described is performed in a very short space of time.

61 indicates separable jaws forming a continuation of the chute and with its operative parts constituting stick-filling or bobbin-discharging mechanism. They are pivoted together by means of a pin 62 and are supported by a bracket-arm 63, through which the pin passes.

Figures 2, 3, 4, 5:
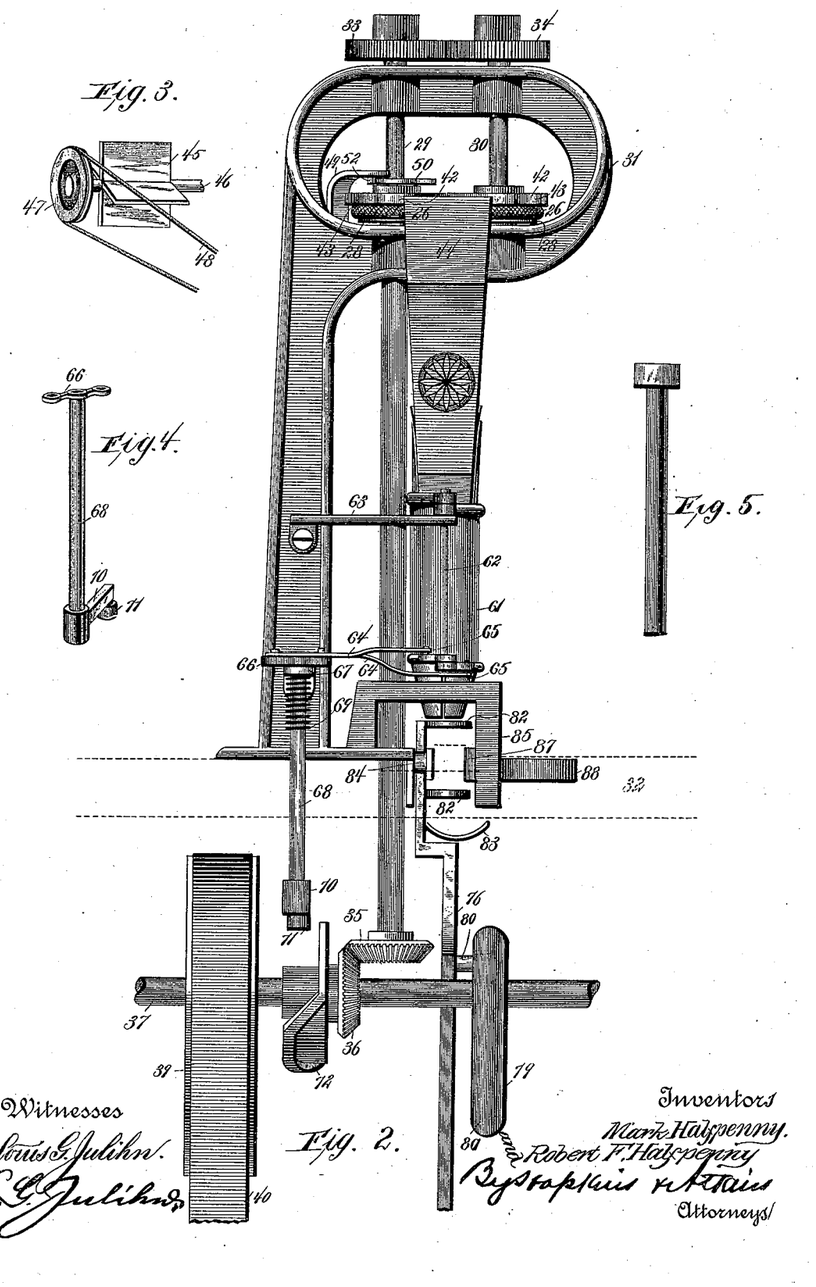
Fig. 2 is a front elevation of the head.
Fig. 3 is a detail view of the distributer detached.
Fig. 4 is a detail view of the jaw-actuating lever detached.
Fig. 5 is a view of a bobbin.

64 indicates arms pivotally secured, as indicated at 65, to the separable jaws, respectively, and to a rocking lever 66, that is pivotally carried upon a projection 67, a vertical rod 68, passed through an opening in the projection and secured to the rocking lever, being provided for this purpose. A spring 69, preferably wrapped around the bar, is adapted to keep the rocking lever in a certain position and to keep the jaws normally closed. Upon the extremity of the bar is provided an arm 70, that carries upon its extremity an antifriction-roller 71. (Clearly illustrated in Fig. 4 of the drawings.)

72 indicates a cam secured to the shaft 37 and in operative proximity with the arm 70 of the rod 68. The cam is adapted at regular intervals to operate against the roller 71 upon the arm, partially rotating the rod 68 and opening the separable jaws 61. The operation of this cam is timed to immediately follow the operation of the feed-disks and the discharge of the bobbin-frame in the manner above described.

73 indicates a bobbin-stick, which is adapted to slide longitudinally upon the table 32 and the inner platform 74. It is necessary to the complete operation of our machine to provide suitable stick-feeding mechanism, whereby one of the holes 75, with which the stick is pierced at regular intervals, may be presented underneath the separable jaws prior to each discharge therefrom of a bobbin and for advancing the stick immediately thereafter, in order to present an empty hole for the reception of the next bobbin discharged.

Figure 11:
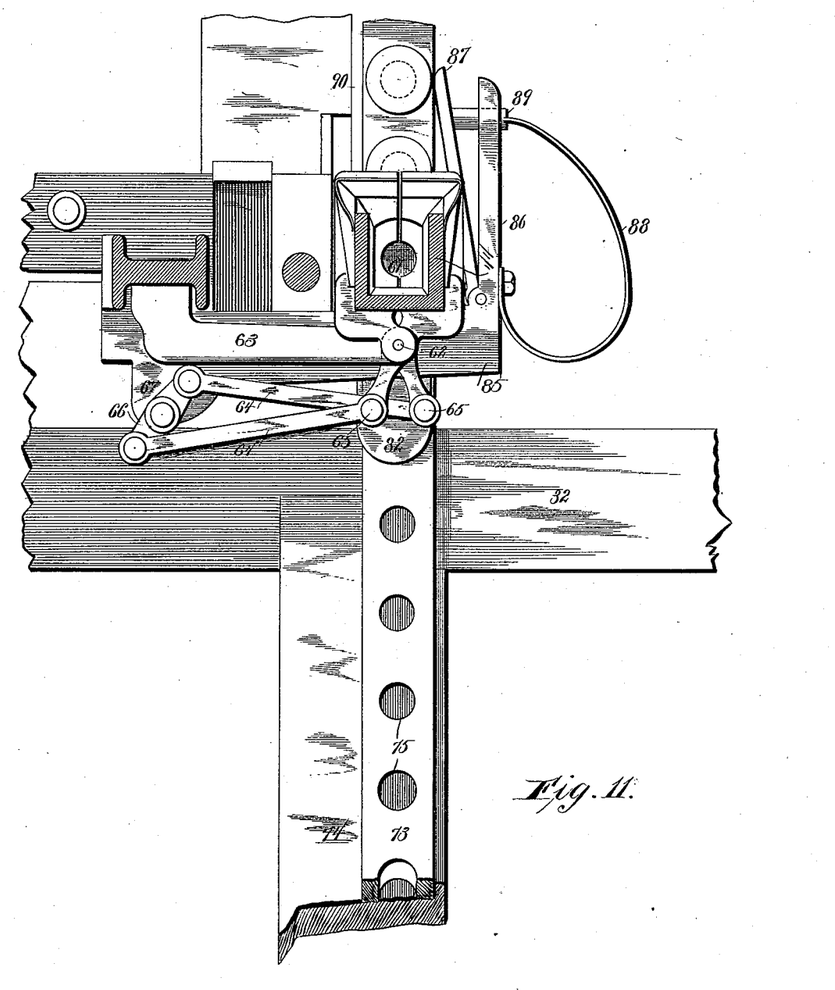
Fig. 11 is a horizontal sectional view immediately above the bobbin-setting jaws.
Figure 12:
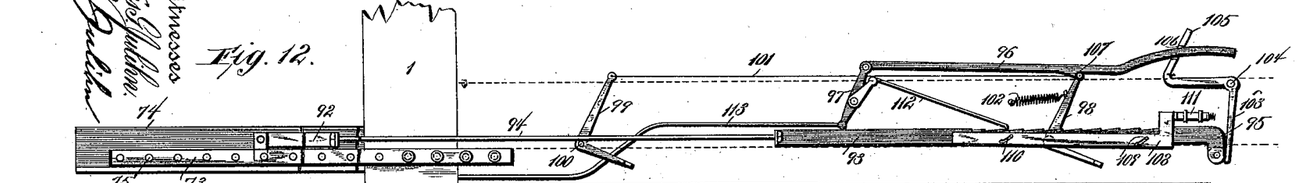
Fig. 12 is a top plan view of the stick advancing and discharging mechanism, showing one stick in the condition of being discharged.
Figure 13:
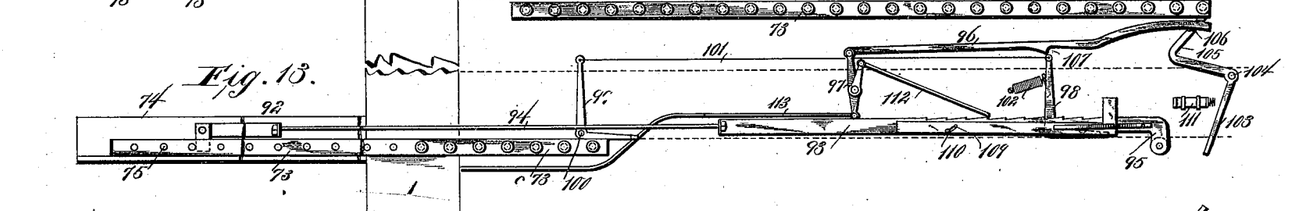
Fig. 13 is a similar view showing the stick-advancing mechanism in the act of being restored to its initial position.
Figure 14:
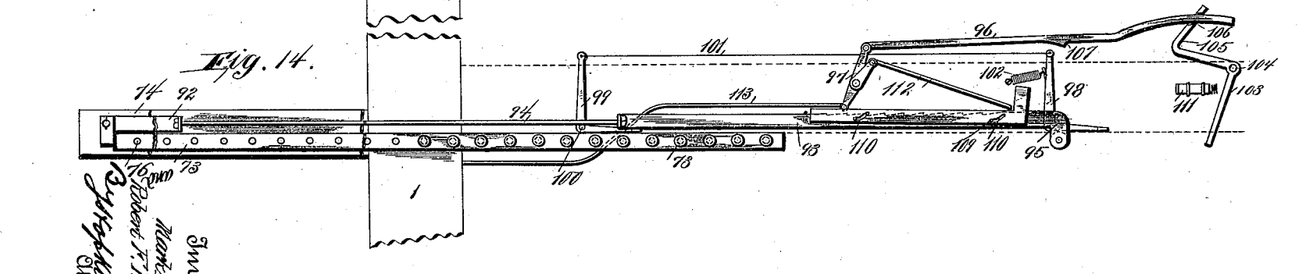
Fig. 14 is a similar view showing the mechanism in the completely-restored position.

In the accompanying drawings we have illustrated suitable direct stick-feeding mechanism, which consists of a lever 76, having a curve 77 in its upper part and pivoted at its lower extremity to an adjustable support 78. The lever is designed to be actuated by an eccentric 79 and is provided with a pin 80, which enters a peripheral groove in the eccentric. The eccentric is secured to the shaft 37 and is rotated synchronously with the cam 72, but is timed so as to operate when the cam is inactive. Consequently the lever operates immediately after the jaws have been opened by the operation of the cam in the manner above described. The jaws opening drop a bobbin into a hole in the stick, which is, as clearly indicated in Fig. 11 of the drawings, opposite the jaws at this stage of the operation. Immediately thereafter the rock-lever is operated by its eccentric, and the projections 82 upon its upper part striking against the bobbin moves the stick forward a sufficient distance to move the next hole in the stick underneath the chute-jaws. It should be observed that this operation is dependent upon the bobbins being in position. If the bobbin for any reason should fail to take its place, the stick would not be operated by the movement of the lever, but would wait for the next operation of the machine and the proper filling of the stick. It will be perceived, therefore, that all danger of discharging an incompletely-filled stick from the machine is avoided.

83 indicates a pan or support adapted to sustain each bobbin temporarily as it enters the stick and thereby cause the lever 76 to strike the shank of it squarely and evenly to advance the stick.

84 indicates a stop for limiting the backward movement of the lever 76.

85 indicates an angular frame-piece designed to support an arm 86, to which is pivoted a swinging arm 87, that, under an impulse imparted to it by the spring 88 through a sliding plug 89, holds the bobbin-stick pressed firmly and evenly against a fixed guide—as, for example, a rib 90, that projects upwardly from the table.

Thus far we have shown bobbin-feeding, bobbin-separating, and stick-filling mechanism in connection with direct bobbin-stick-feeding mechanism.

We shall now proceed to describe auxiliary feeding mechanism for bringing each bobbin-stick within the operation of the direct feeding mechanism, and for feeding the filled stick laterally in order to permit the continuous feeding of sticks underneath the chute-jaws, and preventing the filled stick from impeding the progress of the stick that is being filled and thereby interrupting or clogging the operation of the machine.

Referring to the details of this mechanism, which are most clearly illustrated in Figs. 1, 12, 13, and 14 of the drawings, 91 indicates a stacker adapted to carry in proper alignment a stack of empty bobbin-sticks, from which the bottom one is from time to time abstracted, so as to cause the one above it to immediately take its place without the attention of an operator. For this purpose we prefer to employ a flat angle-iron 92, that is connected to a ratchet-toothed rack 93 by a bar 94, for example.

Figures 15, 16:
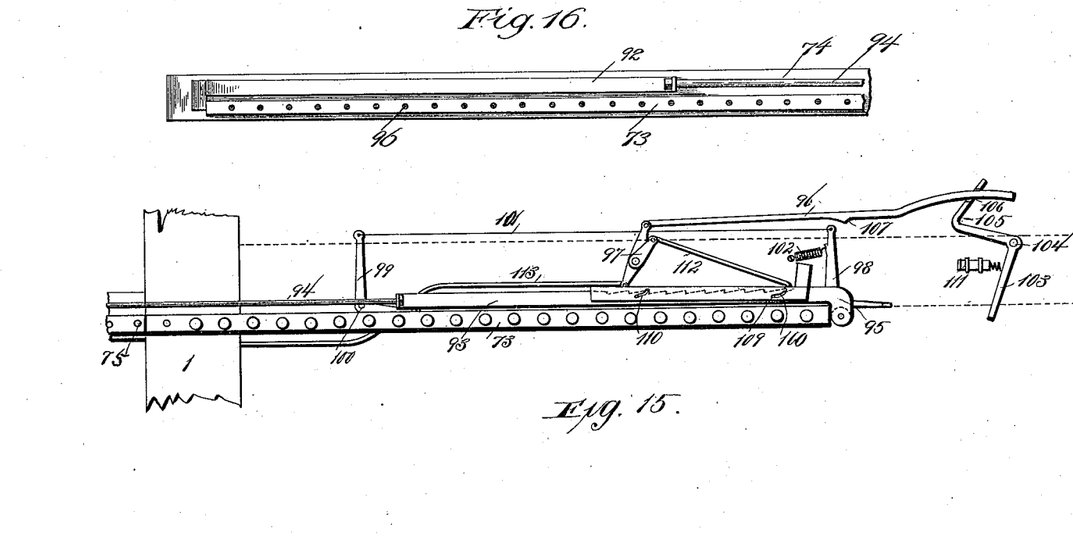
Fig. 15 is a similar view showing the stick-advancing mechanism about to discharge a filled stick and to receive a new one.
Fig. 16 shows in detail the rear end of the new stick partially illustrated in Fig. 15.

95 indicates an elbow in the end of the ratchet-rack. Before the bottom stick is to be displaced the angle-iron is always located behind the stick to be displaced, so that by its forward movement it can slide the stick forward and bring it within the influence of the direct feeding mechanism. For the purpose of imparting such motion to the angle-iron the parts are so adjusted that when the last bobbin in the filled stick has been placed in position and the lever 76 has bestowed upon it its last impulse it is driven against the elbow 95, thereby imparting motion to the ratchet-rack and to the angle-iron connected therewith. The relative positions of the parts in this operation are illustrated in Fig. 15 of the drawings. This last-named bobbin-stick continues to advance, pushing the ratchet-rack in front of it under the impulse of the stick behind it, which is being fed by the direct stick-feeding mechanism above described, until it has completed a sufficient distance of travel, when by the operation of other mechanism it is pushed away from before the stick behind it and the angle-bar is restored to its initial position for operation, as above described.

96 indicates a trip-bar pivoted to the frame of the machine by a rock-lever 97 and by a bell-crank lever 98. 99 indicates a similar bell-crank lever pivoted at 100 to the frame and connected to the lever 98 by a rod 101.

102 indicates a spring secured at one end to the frame of the machine and at the other to one arm of the lever 98, and which tends to hold the free arms of the bell-crank levers in positions parallel with the bobbin-stick as it comes from the direct stick-feeding mechanism.

103 indicates a trip bell-crank lever that is pivoted at 104 to the frame and is provided with a third arm 105, within which is an aperture 106, through which is passed the end of the trip-bar 96. When in the manner above described the filled bobbin-stick has pushed the ratchet-rack forward against the free arm of the trip bell-crank lever, it turns it upon its pivot and depressing the trip-bar brings its notch 107 into engagement with the bell-crank lever 98. The trip-bar is in operation constantly reciprocatory, so that as soon as it comes into engagement with the bell-crank lever it throws it forward against the tension of its spring 102 and shoves the bobbin-stick from in front of the bobbin-stick immediately behind it, leaving the way clear for its progress through the machine in like manner as its predecessor. The ratchet-rack carries an angle-plate 108 by means of pins 109, that enter diagonal and somewhat broken slots 110 in the plate. By reason of this construction the angle-plate is susceptible of a transverse movement upon the ratchet-rack. Being in one position it covers the ratchet-teeth of the rack and in the other position it uncovers them. Up to the time when the ratchet-rack has operated the trip-bar in the manner just described the ratchet-teeth will have been covered; but nearly simultaneous with that operation the angle-plate will come into contact with a yielding stop 111 and the plate will be automatically shifted, so as to uncover the ratchet-teeth. Thereupon a pawl 112, which is secured to the shaft of the rock-lever 97 and which has been hitherto sliding back and forth upon the smooth edge of the angle-plate, begins to engage with the teeth of the ratchet and with each movement of the rock-lever draws the ratchet-rack back the length of one of the ratchet-teeth. Those teeth are of such a number and size as that when, after the operation heretofore described, the pawl has traveled over each of the ratchet-teeth the angle-iron will be in position for starting another empty bobbin-stick through the machine, as in the manner above explained.

The movement of the rock-lever and of the trip-bar secured thereto is imparted by a drive-rod 113, secured at one end to the lever 76 and at the other to the lower arm of the rock-bar. It will be perceived, therefore, that the movement of the ratchet-rack is timed to the movement of the lever 76, which is the main bobbin-stick-feeding lever. Immediately before the ratchet-rack has completed its backward travel the pawl 112 strikes into the angle-plate and shifts it across the ratchet-rack, so as to cover and guard its teeth, thereafter permitting the free forward movement of the ratchet-rack until interrupted in the manner as above described, the pawl meantime moving smoothly without obstruction across the edge of the angle-plate.

114 indicates a bobbin-stick platform carried by supports 115 upon the frame. This platform in practice receives the filled bobbin-sticks as they are displaced by the lateral feed mechanism. Near the extremity of one of the platform-arms is carried upon a depending arm 116 a pivoted trigger 117, that engages with an arm 118, that is secured to a shaft 119, carried in suitable bearings 120. This shaft is provided with a ball or counterweight 121. It is also in operative communication with a clutch 122 by means of a lever 123, pivoted, as indicated at 124, to the frame. When the platform is filled with bobbin-sticks, the outside one trips the trigger 117 and releases the arm 118. Thereupon the shaft is rotated by its counterweights, and by means of the clutch the main driving-pulley 125 is thrown out of engagement with the main driving-shaft and the machine immediately comes to a standstill. After removing the filled bobbin-sticks the arm 118 may be again set by its trigger and the operation of the machine repeated as before.

The operation of our machine is as follows: Power being applied to the main driving-pulley, motion is imparted to the chute-conveyer, the conveyers, the feed-disks, and to the direct feeding mechanism. The bobbins having been thrown loosely into the hopper, they are caught up by the collector and deposited thence into the hopper-chute. They are then taken up by the conveyers and carried toward the feed-disks, where they are separated in the manner above described and fed through the rotary disks into the feed-chute, whence they are deposited at proper intervals and slipped into the holes in the bobbin-sticks, which are regularly fed under the feed-chutes, so as to present for each bobbin its respective hole. When one stick has been filled, it is retained a sufficient length of time to operate the auxiliary feeding mechanism for bringing the next one into the direct feeding mechanism in the manner above set forth in detail, and is then laterally discharged upon the platform. When a sufficient number of bobbin-sticks to fill the platform has accumulated thereon, the trip mechanism before described operates to interrupt the motion of the machine and to prepare it for a repetition of its operation. So long as it is designed to remove the filled bobbin-sticks from the machine at regular intervals it is necessary to provide for the automatic interruption of the working of the machine; otherwise the bobbin-sticks would be crowded upon one another, displaced, and thrown into confusion. If, however, provision is made for the continuous removal of the bobbin-sticks as they are discharged from the machine, it will be unnecessary to make provision for any interruption of its operation.

While we have shown and described particular mechanism for accomplishing certain results in the line of our invention, we do not desire to limit ourselves in any respect to the details of construction, because they may be modified and varied in many respects without departing from the scope of our invention. We would refer, particularly, in this respect to the ratchet-rack-restoring mechanism and to the bobbin-stick lateral-feed mechanism. In these mechanisms there is considerable waste motion, with which we shall, perhaps, hereinafter find it desirable to dispense. The object of this specification is to disclose our invention in its entirety and in that embodiment which at the present time we consider preferable.

What we claim is—

1. The combination with mechanism for collecting and conveying bobbins of mechanism for distributing them in a bobbin stick, said collecting, conveying and distributing mechanisms co-operating to fill a bobbin stick with bobbins, substantially as and for the purpose specified.

2. The combination with a bobbin conveyer, of bobbin separating mechanism and stick filling mechanism, said mechanism co-operating to fill bobbin sticks with bobbins, substantially as and for the purpose specified.

3. The combination of bobbin feeding, bobbin separating and stick filling mechanisms co-operating to feed and separate bobbins, and fill bobbin sticks therewith, substantially as and for the purpose specified.

4. The combination with bobbin feeding, and bobbin separating mechanisms, of stick filling mechanism and bobbin stick feeding mechanism co-operating to fill bobbin sticks with bobbins, substantially as and for the purpose specified.

5. In a bobbin stick filling machine, the combination with bobbin feeding and bobbin separating mechanisms, of stick filling mechanism, direct bobbin stick feeding mechanism and lateral bobbin stick feeding mechanism all co-operating to fill bobbin sticks with bobbins to feed the bobbin sticks under the filling mechanism and to displace the filled stick, substantially as and for the purpose specified.

6. In a machine for filling bobbin-sticks, the combination with bobbin-feeding mechanism, of mechanism adapted to collect the bobbins from a hopper and convey them to the feeding mechanism, substantially as set forth.

7. In a machine for filling bobbin-sticks, the combination with bobbin-feeding mechanism and bobbin conveying mechanism, of bobbin-separating mechanism adapted to successively separate the bobbins and present them one at a time to the feeding mechanism, substantially as set forth.

8. In a machine for filling bobbin sticks, the combination with bobbin feeding and bobbin separating mechanisms, of mechanism operatively connected therewith adapted to present one bobbin at a time to the feeding mechanism, and bobbin discharging mechanism also operatively connected therewith adapted to drop the separated bobbin into a hole in a bobbin stick, substantially as and for the purpose specified.

9. In a machine for filling bobbin-sticks, the combination with a horizontal conveyer, of distributing mechanism cooperating therewith, substantially as set forth.

10. The combination with a bobbin-conveyer, of feeding mechanism consisting of a pair of notched disks adapted to receive and carry the head of a bobbin from the conveyer by the rotation of the disks, substantially as set forth.

11. In a machine for filling bobbin-sticks, the combination with a bobbin-conveyer, of feeding mechanism consisting of notched rotary disks and separating mechanism consisting of a finger and an automatic kicker, substantially as set forth.

12. In bobbin-feeding mechanism for a machine for filling bobbin-sticks, the combination of a frame, a pair of rotary notched disks, a cam upon one of the disks, a lever actuated thereby, a finger pivoted to the lever, a bell-crank kicker pivoted to the finger, a stop upon the frame, and a spring secured to the frame and bearing against a projection upon the kicker, substantially as and for the purpose specified.

13. In a machine for filling bobbin sticks with bobbins, the combination with a conveyer, and feeding mechanism operatively connected, of a separator and bobbin discharging mechanism adapted to discharge the separated bobbins into the bobbin stick, substantially as and for the purpose specified.

14. In a machine for filling bobbin sticks with bobbins, the combination with a conveyer, and bobbin feeding mechanism operatively connected therewith, of a bobbin separator and bobbin discharging mechanism timed to operate immediately after the operation of the feeding mechanism, whereby the bobbin is successively conveyed, separated, fed to the discharging mechanism and finally discharged into the bobbin stick, substantially as and for the purpose specified.

15. In a machine for filling bobbin sticks with bobbins, the combination with a bobbin conveyer, bobbin separator and bobbin feeding mechanism, of a chute terminating in separable jaws and adapted to receive the bobbins all co-operating to fill a bobbin stick with bobbins, substantially as and for the purpose specified.

16. In a machine for filling bobbin-sticks, the combination with a conveyer, separator, bobbin-feeding mechanism, and separable bobbin-discharging jaws, of mechanism for operating the same, the operative mechanism of the bobbin-discharging jaws and the bobbin-feeding mechanism being operatively connected to follow each other in quick succession, substantially as set forth.

17. In bobbin-feeding mechanism, and bobbin-discharging mechanism, of a machine for filling bobbin-sticks, the combination with a revoluble shaft, of the feed mechanism shaft constantly geared thereto, and a bobbin-discharging mechanism intermittently actuated thereby, substantially as set forth.

18. In a machine for filling bobbin-sticks, the combination with separable jaws adapted to receive a single bobbin at a time and to discharge it into a stick, of a spring-actuated rod and rock-lever, connecting pieces between the respective ends of the rock-lever, and the separable jaws, an arm upon the extremity of the rod carrying the rock-lever, a driving shaft and a cam in operative proximity to the arm upon the rock-lever rod, substantially as set forth.

19. In a machine for filling bobbin-sticks, the combination with a frame adapted to carry a bobbin-stick, and mechanism for inserting bobbins successively into the holes of the stick, of an intermittently-actuated bobbin-stick feeding lever, substantially as set forth.

20. In a machine for filling bobbin-sticks, the combination with a frame adapted to carry a bobbin-stick, and mechanism for successively inserting bobbins into the holes of the stick of bobbin stick-feeding mechanism adapted to feed the stick along the frame as each hole of the stick is successively supplied with a bobbin, and not otherwise, substantially as set forth.

21. In a machine for filling bobbin-sticks, the combination with a frame adapted to carry a bobbin-stick, and mechanism for delivering bobbins successively to the holes in the stick, of an intermittently-actuated bobbin-stick feed-lever, and projections upon the lever above and below the bobbin-stick adapted to strike the bobbins as they are successively inserted in place in the stick, substantially as set forth.

22. In a machine for filling bobbin-sticks, the combination with a frame adapted to carry a stick, and mechanism for successively inserting bobbins into the holes in the stick, of intermittently actuated stick-feeding mechanism, a guide, and an opposite spring-actuated arm adapted to direct the movement of the stick, substantially as set forth.

23. In a machine for filling bobbin-sticks, the combination with a frame adapted to support a bobbin-stick, and mechanism for inserting bobbins successively in the holes of the bobbin-stick, of direct bobbin-stick feeding mechanism, and auxiliary stick-feeding mechanism adapted to present a new stick to the direct feeding mechanism immediately after the one preceding has been filled, substantially as and for the purpose specified.

24. In a machine for filling bobbin-sticks, the combination with a frame adapted to support a bobbin-stick, and mechanism for inserting bobbins successively into the holes of the stick, of direct bobbin-stick feeding mechanism, and auxiliary bobbin-stick feeding mechanism adapted to present a new stick to the direct feeding mechanism immediately after the one preceding shall have been filled, the auxiliary feeding mechanism being connected with the direct-feeding mechanism and operated thereby, substantially as set forth.

25. In a machine for filling bobbin-sticks, the combination with direct stick-feeding mechanism, of auxiliary stick-feeding mechanism, consisting of an angle iron, adapted to be propelled by the stick fed by the direct feeding mechanism, and mechanism operatively connected with the direct feeding mechanism for restoring the angle iron to its original position each time after it has presented a new stick to the direct feeding mechanism, substantially as and for the purpose specified.

26. In a machine for filling bobbin sticks with bobbins, the combination with direct bobbin stick feeding mechanism adapted to feed the stick longitudinally for facilitating its filling, and automatic lateral bobbin stick feeding mechanism adapted to automatically displace the filled bobbin stick to admit of the continued operation of the machine, substantially as and for the purpose specified.

27. In a machine for filling bobbin-sticks, the combination with direct stick-feeding mechanism, of lateral stick-feeding mechanism adapted to be actuated by the discharge of a filled stick from the direct stick-feeding mechanism, substantially as set forth.

28. In a machine for filling bobbin-sticks, the combination with direct stick-feeding mechanism, of a stacker and auxiliary stick-feeding mechanism adapted to abstract the bottom stick from the stacker in each successive operation, substantially as set forth.

29. In a machine for filling bobbin-sticks, the combination with direct stick-feeding mechanism, and auxiliary stick feeding mechanism of lateral stick-feeding mechanism consisting of a ratchet-rack, a constantly reciprocatory trip-bar, connected bell-crank levers, a plate adapted to automatically cover and uncover the ratchet of the rack, a pawl acting with the trip-bar, a bell-crank trip-lever adapted to be actuated by the movement of the ratchet-rack, and a yielding stop in the path of the ratchet cover, substantially as and for the purpose specified.

30. In a machine for filling bobbin-sticks, the combination with mechanism for inserting bobbins successively into the holes of a stick, of direct and lateral stick-feeding mechanism, a platform adapted to receive the laterally fed sticks, and automatic stop mechanism for interrupting the operation of the machine when the platform is filled with sticks, substantially as set forth.

31. In a machine for filling bobbin sticks with bobbins, the combination with bobbin discharging mechanism, of mechanism operatively connected therewith for distributing the discharged bobbins in a bobbin stick, substantially as and for the purpose specified.

32. In a machine for filling bobbin sticks with bobbins, the combination with a frame or support, of mechanism adapted to discharge bobbins into a bobbin stick, substantially as and for the purpose specified.

In testimony of all which we have hereunto subscribed our names.

MARK HALFPENNY.
ROBERT FOSTER HALFPENNY.

Witnesses:
WILLIAM F. BARBER,
PHILIP B. LINN.